Jan. 27, 1953          E. H. APPEL          2,626,698
DISCHARGE ARRANGEMENT FOR AGRICULTURAL LOADING MACHINES
Filed June 17, 1947
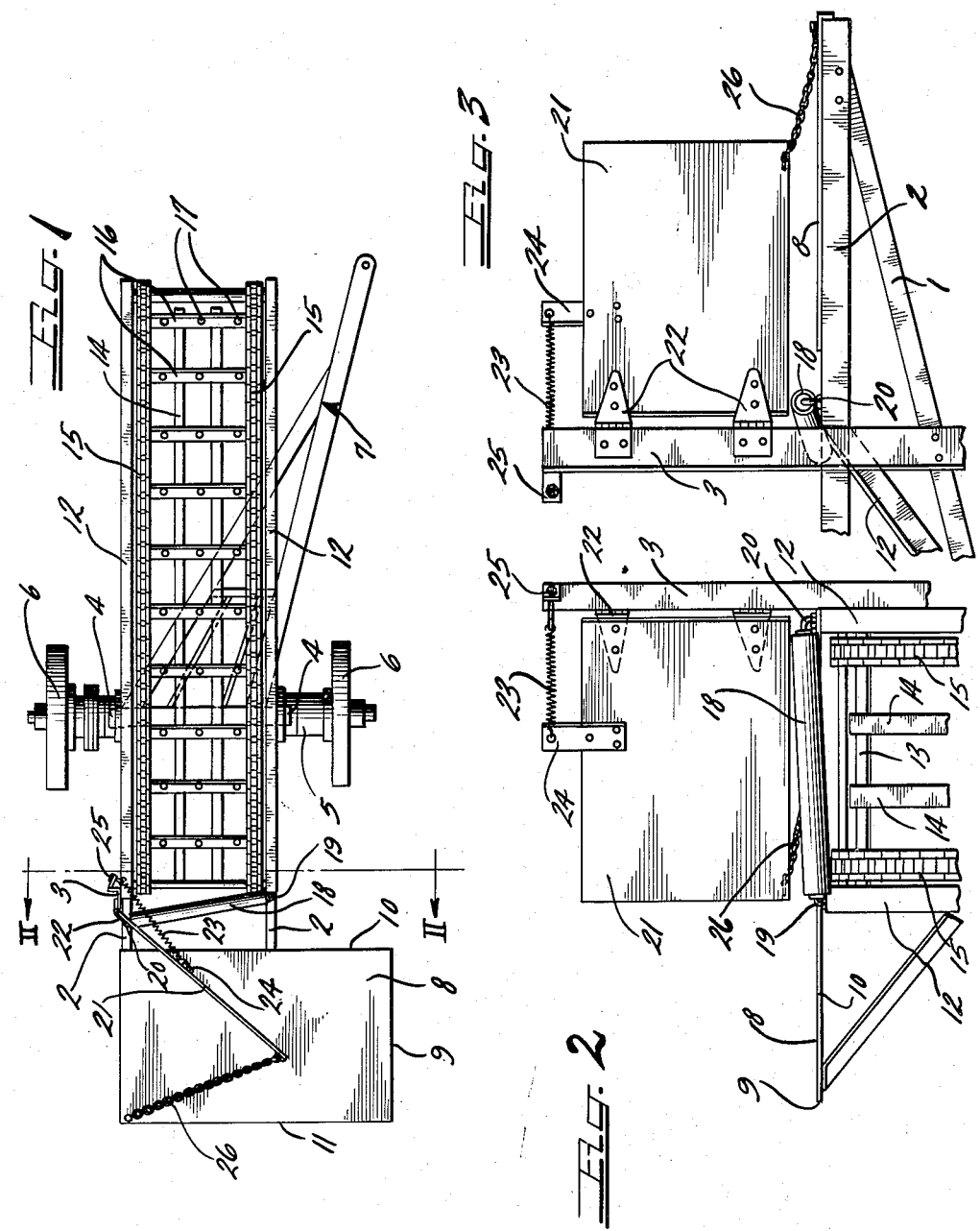
Inventor
EVERETT H. APPEL
By The Firm of Charlesworth&Hills Attys.

Patented Jan. 27, 1953

2,626,698

UNITED STATES PATENT OFFICE 2,626,698

DISCHARGE ARRANGEMENT FOR AGRICULTURAL LOADING MACHINES

Everett H. Appel, Aurora, Ill.

Application June 17, 1947, Serial No. 755,089

2 Claims. (Cl. 198—65)

This invention relates to improvements in a discharge arrangement for an agricultural loading machine of the type generally employed to elevate bales, shocks, and similar items to an adequate level for proper piling on a wagon, truck, or other transporting vehicle, although the invention may have other uses and purposes as will be apparent to one skilled in the art.

The instant invention is an improvement upon the loading machine and discharge apparatus associated therewith that is more fully set forth, described and claimed in my copending application for Letters Patent entitled "Agricultural Loading Machine," filed April 19, 1944, Serial No. 531,693, now Patent No. 2,460,441.

Especially when the loading machine is propelled by the power unit for the ultimate transporting vehicle, and so moves along at one side of the transporting vehicle, it is desirable to discharge bales or other loads from the loading machine in a sidewise direction, that is substantially at right angles to the elevating mechanism of the loading machine. In the past where a conveyor has been used in the loading trough of the machine, another transverse conveyor has been provided at the top of the loading machine to carry the load over to the wagon or other transporting vehicle. That is an exceedingly expensive and cumbersome construction. Where such construction was not used, and in many cases where the double conveyor was used, jamming too frequently resulted at the top of the loading machine, by virtue of the machine picking up two separate loads such as two separate bales almost at the same time, that is with one bale immediately following another bale up the loading trough of the machine. Such jamming, of course, may result in sudden injury to either the loading machine or to an operator on the transporting vehicle, and is highly objectionable.

With the foregoing in mind, it is an important object of the instant invention to provide a discharge arrangement in association with a loading machine whereby jamming is discouraged, but provision is made for the immediate release of a jam in such does occur.

Another object of this invention is the provision of a loading machine equipped with a discharge arrangement embodying a yieldable means for guiding a load to delivery position, which means will yield sufficiently upon pressure from a multiple load to permit the quick discharge of a portion of a multiple load in a different direction than delivery position to expeditiously break a jam.

It is also an object of this invention to provide a loading machine equipped with a discharge arrangement wherein loads are automatically guided toward discharge position.

A further feature of the invention resides in the provision of a loading machine embodying an inclined trough up which loads are carried, and having a discharge platform above the trough, with a free running roller adjacent the discharge platform with the axis of the roller skewed laterally so as to better guide a load toward delivery position from the platform.

Also a feature of the invention resides in the provision of a loading machine having an inclined loading trough which delivers loads upon a discharge platform, with a free running roller adjacent that platform having its axis skewed vertically so as to better guide a load to the delivery side of the platform.

It is also a feature of this invention to provide a loading machine embodying an inclined loading trough with the delivery platform at the top thereof, and a free running roller skewed on its axis both vertically and laterally so as to cause a load to turn toward the delivery side of the platform when it arrives at the top of a loading trough.

Still a further feature of the invention results in the provision of a loading machine incorporating an inclined loading trough with a delivery platform at the upper end thereof, and a vertically mounted swingable gate associated with the platform to properly guide loads toward the delivery side of the platform.

Still a further object of the invention resides in the provision of a loading machine having an inclined loading trough with the discharge platform at the top thereof, and a vertically mounted gate hinged to swing over the platform, there being resilient means to maintain the gate in a normal oblique position relatively to the platform, such resilient means being yieldable upon pressure from a multiple load to swing back and permit a portion of the load to be discharged other than at the delivery side of the platform so as to immediately break a jam or eliminate the occurrence of a jam.

While some of the more salient features, characteristics and advantages of the instant invention have been above pointed out, others will become apparent from the following disclosures, taken in conjunction with the accompanying drawing, in which—

Figure 1 is a plan view of a loading machine equipped with a discharge arrangement embodying principles of the instant invention;

Figure 2 is a fragmentary front elevational view of the discharge arrangement, this figure being taken substantially as indicated by the line II—II of Fig. 1, looking in the direction of the arrows, although Fig. 2 is not a sectional view; and Figure 3 is a fragmentary side elevational view of the discharge arrangement, taken from the right hand side of Fig. 2.

As shown on the drawings:

The loading machine in the illustrated embodiment of this invention includes a frame incorporating side rails 1—1 that are upwardly inclined, horizontal rails 2—2 at the upper end of the side rails, and an angular upright 3 connecting the frame members 1 and 2 at one side of the apparatus. The frame construction also embodies other various cross pieces, not illustrated, and uprights 4—4 by means of which the frame may be carried in a stationary axle structure 5 in turn carried by freely rotatable ground wheels 6—6. Extending laterally from the frame is a subframe arrangement generally indicated by numeral 7 which projects obliquely to one side of the main frame for connection to a motor vehicle by means of which the loading machine is moved over the ground. Usually, the motor vehicle may be in the form of a truck or tractor pulling a wagon, trailer, or other body arrangement for receiving bales, shocks, or similar loads from the loading machine. That transporting vehicle will usually operate parallel to the loading machine, so that the loads may be discharged sidewise from a discharge platform 8 carried by the frame members 2—2, directly into the transporting vehicle.

It will be noted from the showing more particularly in Figs. 1 and 2 that the discharge platform may project at one side beyond the frame of the loading machine, and in normal operation the side edge 9 will be the delivery edge or side of the platform. When a load arrives on the platform 8, it passes over the forward edge 10 of the platform, and under emergency conditions, as will more fully be explained later herein, a load may be discharged over the rear edge 11 of the platform so that that particular load will miss the transporting vehicle.

Also carried by the frame of the machine is a structure that may be for convenience termed a loading trough, and this trough is upwardly inclined. The loading trough includes a pair of side rails 12—12 connected at intervals by transverse supports 13, which supports preferably carry a number of longitudinally extending and spaced track bars 14.

Associated with the loading trough is an endless conveyor, including side chains 15—15 with transverse flights 16 at spaced intervals along the chains. As seen best in Fig. 1, each flight is equipped with a plurality of upstanding pins or projections 17 so as to better engage a load. Any suitable form of pickup means may be utilized at the lower end of the loading trough, and any drive means that is satisfactory may be utilized to move the conveyor up the loading trough. During operation a load is picked up at the lower end of the loading trough, carried up the loading trough by the flights on the conveyor, and deposited on the discharge platform 8 from which it is removed over the side edge 9 into the transporting vehicle.

In the instant invention, means are provided to more effectively guide a load toward the delivery side 9 of the discharge platform, and to prevent accidents and injury to either the mechanism or an operator by jamming of loads at the top of the conveyor or loading trough and on the platform.

To this end, a free running roller 18 is mounted generally transversely of the loading trough adjacent the top of the loading trough, and substantially between the loading trough and the discharge platform. As is seen best in Fig. 2, this roller is carried on a fixed bearing 19 at the inner end, or end nearest the transporting vehicle, and by a higher fixed bearing 20 at the outer end, or end opposite the delivery side of the discharge platform. With reference to Fig. 1, it will be seen that the axis of the roller 18 is skewed laterally so that the outer end of the roller is closer to the discharge platform than the inner end of the roller. This roller is also skewed vertically, as seen in Fig. 2, more particularly, so that the outer end of the roller is higher than the inner end of the roller. Thus, when a bale or other load is brought up the loading trough by the conveyor, the bale striking this roller is automatically given a turn by virtue of its passage over the roller toward the delivery side of the discharge platform, and this turning of the bale is augmented gradually as the entire bale passes over the roller.

To further aid the guiding of a bale or other load and to eliminate jamming, a vertically disposed gate 21 is hinged along one side edge as indicated at 22 to the aforesaid frame upright 3. This gate 21 is biased by a spring 23 to an oblique position relatively to the discharge platform 8, as clearly seen in Fig. 1. One end of the spring is attached to a bracket 24 on the gate, and the other end to a bracket 25 on the frame upright 3. A chain 26 or equivalent means is used to limit the forward swing of the gate caused by the spring 23, this chain being attached to the far corner of the discharge platform and to the rear of the gate.

The spring 23 is preferably of such strength as to hold the gate in the inclined or oblique position relatively to the platform, but to yield somewhat when a load contacts the gate. Thus, if a bale is brought up the loading trough, the bale is turned somewhat toward the delivery side 9 of the platform by means of the roller 18, and is further guided toward that delivery side by contact with the gate 21. However, if a multiple load should arrive almost at the same time on the loading platform, that is should one bale be very closely behind the preceding bale, there is danger of jamming on the platform or at the top of the loading trough, and such a jam may well cause injury to the apparatus or to an operator. Under pressure of a multiple load, the gate will be forced backward against the action of the spring 23, and the first portion of the load may be quickly discharged over the rear side 11 of the loading platform so as to fall on the ground, thus immediately breaking the jam. That bale or portion of another load that fell on the ground will, of course, have to be picked up later, but that is far better than risking the undesirable results of a jam.

From the foregoing, it will be apparent that I have provided a novel and highly efficient discharge arrangement for a loading machine, which arrangement not only serves to guide the load toward the delivery side of the discharge platform, but also is effective in immediately breaking or disrupting a jam, if such occurs. It will be noted that the apparatus used is highly durable, and quite economical in construction.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an agricultural loading machine, an inclined loading trough, elevating means to carry loads up said trough, a discharge platform adjacent the top of said trough arranged to discharge a load from the side thereof, a vertical gate hinged at one side of said platform, resilient means to urge said gate forwardly toward said trough, and means limiting the forward swing of said gate to an oblique position relatively to the platform.

2. In an agricultural loading machine, an inclined loading trough, elevating means to carry loads up said trough, a discharge platform adjacent the top of said trough arranged to discharge a load from the side thereof, a vertical gate hinged at one side of said platform, spring means tending to pull said gate forwardly toward said trough, and limiting means to stop the forward swing of said gate at an oblique position relatively to said platform, said spring means yielding moderately to a single load delivered on the platform by said elevating means but yielding sufficiently to a double load to permit the discharge of one load rearwardly off the platform to avoid jamming.

EVERETT H. APPEL.

REFERENCES CITED

The following references are of record in the file of this patent:

UNITED STATES PATENTS

| Number | Name | Date |
| --- | --- | --- |
| 1,404,591 | Fredrickson | Jan. 24, 1922 |
| 1,945,482 | Dupuy | Jan. 30, 1934 |
| 2,335,924 | Elholm | Dec. 7, 1943 |
| 2,367,970 | Smoker | Jan. 23, 1945 |
| 2,397,570 | Smoker | Apr. 2, 1946 |